United States Patent
Fisher et al.

(10) Patent No.: US 7,198,764 B2
(45) Date of Patent: Apr. 3, 2007

(54) GAS TREATMENT SYSTEM AND A METHOD FOR USING THE SAME

(75) Inventors: Galen Bruce Fisher, Bloomfield Hills, MI (US); Joachim Kupe, Davisburg, MI (US); William J. Labarge, Bay City, MI (US); Craig L. Di Maggio, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 529 days.

(21) Appl. No.: 10/379,762

(22) Filed: Mar. 5, 2003

(65) Prior Publication Data

US 2004/0173450 A1 Sep. 9, 2004

(51) Int. Cl.
*B01J 19/08* (2006.01)

(52) U.S. Cl. .................... 422/186.04; 60/275
(58) Field of Classification Search ........... 422/186.04; 60/275

See application file for complete search history.

(56) References Cited

U.S. PATENT DOCUMENTS

| | | | |
|---|---|---|---|
| 3,925,253 A * | 12/1975 | Stephens | 502/241 |
| 5,711,147 A | 1/1998 | Vogtlin et al. | 60/274 |
| 5,746,984 A | 5/1998 | Hoard | 422/169 |
| 5,942,195 A * | 8/1999 | Lecea et al. | 422/174 |
| 6,038,854 A | 3/2000 | Penetrante et al. | 60/297 |
| 6,872,365 B1 * | 3/2005 | Boegner et al. | 422/174 |
| 6,908,596 B2 * | 6/2005 | Kinoshita et al. | 422/186.04 |
| 2002/0137627 A1 | 9/2002 | Kayama et al. | 502/201 |

* cited by examiner

*Primary Examiner*—Kishor Mayekar
(74) *Attorney, Agent, or Firm*—Paul L. Marshall

(57) ABSTRACT

In one embodiment, a method of treating a gas stream comprises: controlling an amount of the $NH_3$ entering a catalytic unit and converting $NO_2$ and the $NH_3$ to $N_2$ in the catalytic unit, wherein greater than or equal to about 60 wt % of NOx initially in the gas stream is converted to $N_2$. In one embodiment, a gas treatment system comprises: a plasma reactor disposed downstream of an engine; a cracking catalyst disposed downstream of the engine; and a catalytic unit capable of converting NO and HC to $NH_3$, and capable of converting $NH_3$ and $NO_2$ to $N_2$.

10 Claims, 1 Drawing Sheet

GAS TREATMENT SYSTEM AND A METHOD FOR USING THE SAME

TECHNICAL FIELD

This disclosure relates to removal of detrimental pollutants from a gas stream.

BACKGROUND

Internal combustion engines operate by the controlled combustion of hydrocarbon fuels and produce exhaust gases containing complete combustion products such as carbon dioxide ($CO_2$) and water ($H_2O$), and incomplete combustion products such as carbon monoxide (CO) and unburnt hydrocarbons (HC). Further, due to the very high temperatures produced by the burning of the hydrocarbon fuels, thermal fixation of nitrogen in the air results in the detrimental formation of nitrogen oxide compounds ($NO_x$). Certain compounds in the exhaust are undesirable in that they must be controlled in order to meet government emissions regulations. Among the regulated compounds are hydrocarbons, soot particulates, and $NO_x$.

The quantity of pollutants generated by incomplete combustion varies with operating conditions of the engine, but is influenced predominantly by the air-to-fuel ratio in the combustion cylinder. Conditions conducive to reducing carbon monoxide and unburnt hydrocarbons (a fuel mixture just lean of stoichiometric and high combustion temperatures) cause an increased formation of $NO_x$ and conditions conducive to reducing the formation of $NO_x$ (rich fuel mixture and low combustion temperatures) cause an increase in carbon monoxide and unburnt hydrocarbons in the exhaust gases. As a result, within the region of stable operation of the internal combustion engine, a significant amount of CO, HC and $NO_x$ is emitted from the engine.

Current trends in the automotive industry are driven primarily by more stringent pollution and fuel economy regulations. Diesel and lean burn engines are attractive for a next generation vehicle in view of the fuel economy. However, a $NO_x$-controllable stoichiometric design has not been developed for diesel and lean burn engines.

Excessive oxygen in lean-burn engine exhausts can inhibit $NO_x$ removal in conventional three-way catalytic converters. The exhaust stream from a diesel engine has a substantial oxygen content, from perhaps about 2–18% oxygen, and, in addition, contains a significant amount of particulate emissions. The particulate emissions, or soot, are thought to be primarily carbonaceous particles. The excess oxygen makes lean $NO_x$ catalytic processing inefficient and fraught with limitations such as temperature windows and sulfur poisoning. Therefore, an effective and durable catalyst for controlling $NO_x$ emissions under net oxidizing conditions is critical for diesel engines.

$NO_x$ adsorbers have shown some promise but durability concerns, sulfur poisoning and rich purging requirements have limited their commerciality. $NO_x$ catalysts having activity, durability, and the temperature window to effectively remove $NO_x$ from the exhaust have not been successfully developed. Conventional lean $NO_x$ catalysts are hydrothermally unstable. A noticeable loss of activity occurs after relatively little use, and even such catalysts only operate over very limited temperature ranges. Conventional catalysts are therefore inadequate for lean-burn operation and ordinary driving conditions. An alternative is to use catalysts that selectively reduce $NO_x$ in the presence of a co-reductant, e.g., selective catalytic reduction (SCR) using ammonia as a co-reductant. A more active approach such as urea injection with SCR has demonstrated good $NO_x$ control, but the added complexity of the urea injection and the lack of a distribution infrastructure are significant detractors.

As an alternative way to treat the hydrocarbon, particulate, or $NO_x$ emissions in an exhaust, a non-thermal plasma system has been introduced. The unique requirements of a vehicular non-thermal plasma system include high efficiency in not only $NO_x$ reduction but in power generation and control; minimal size, weight, and cost; and durability greater than 100,000 miles. However, these systems suffer from serious shortcomings. First, such systems are run continually, which results in a relatively large power consumption per unit of material destroyed, particularly when used to treat low concentration of emissions in exhaust streams. A more concentrated emission stream would allow less power consumption per molecule of pollutant destroyed. Secondly, when the non-thermal plasma reactor is operated under oxidizing conditions, nitrous oxide tends to be converted into undesirable nitric oxide and nitric acid. The nitric oxide and nitric acid must then be collected and separately treated or disposed of. In the case of automotive exhaust, the undesirable products cannot be easily collected and disposed of. It would be desirable, therefore, to only operate the non-thermal plasma reactor with a non-oxidizing atmosphere. However, as mentioned, it is desirable for reasons of fuel economy to operate an automotive engine under lean burn conditions for as much of the time of operation as possible.

SUMMARY

Disclosed herein are gas treatment systems, vehicle exhaust systems, and methods of treating gases. In one embodiment, a method of treating a gas stream comprises: converting NO to $NH_3$, controlling an amount of the $NH_3$ entering a catalytic unit and converting $NO_2$ and the $NH_3$ to $N_2$ in the catalytic unit, wherein greater than or equal to about 60 wt % of NOx initially in the gas stream is converted to $N_2$.

In one embodiment, a gas treatment system comprises: a plasma reactor disposed downstream of an engine; a cracking catalyst disposed downstream of the engine; and a catalytic unit capable of converting NO and HC to $NH_3$, and capable of converting $NH_3$ and $NO_2$ to $N_2$.

A storage medium encoded with a machine readable computer program code is also disclosed. In one embodiment, the code includes instructions for causing a computer to implement a method for treating a gas stream, comprising: converting NO to $NH_3$, controlling an amount of the $NH_3$ entering a catalytic unit; and converting $NO_2$ and the $NH_3$ to $N_2$ in the catalytic unit; wherein greater than or equal to about 60 wt % of NOx initially in the gas stream is converted to $N_2$.

Also disclosed is a computer data signal. In one embodiment, the computer data signal comprises: instructions for causing a computer to implement a method for method for treating a gas stream, comprising: converting NO to $NH_3$, controlling an amount of the $NH_3$ entering a catalytic unit; and converting $NO_2$ and the $NH_3$ to $N_2$ in the catalytic unit; wherein greater than or equal to about 60 wt % of NOx initially in the gas stream is converted to $N_2$.

The above-described and other features will be appreciated and understood by those skilled in the art from the following detailed description, drawings, and appended claims.

BRIEF DESCRIPTION OF THE DRAWINGS

Referring now to the figures, which are meant to be exemplary, not limiting, and wherein like elements are numbered alike.

DESCRIPTION OF THE PREFERRED EMBODIMENT

Figure 1:
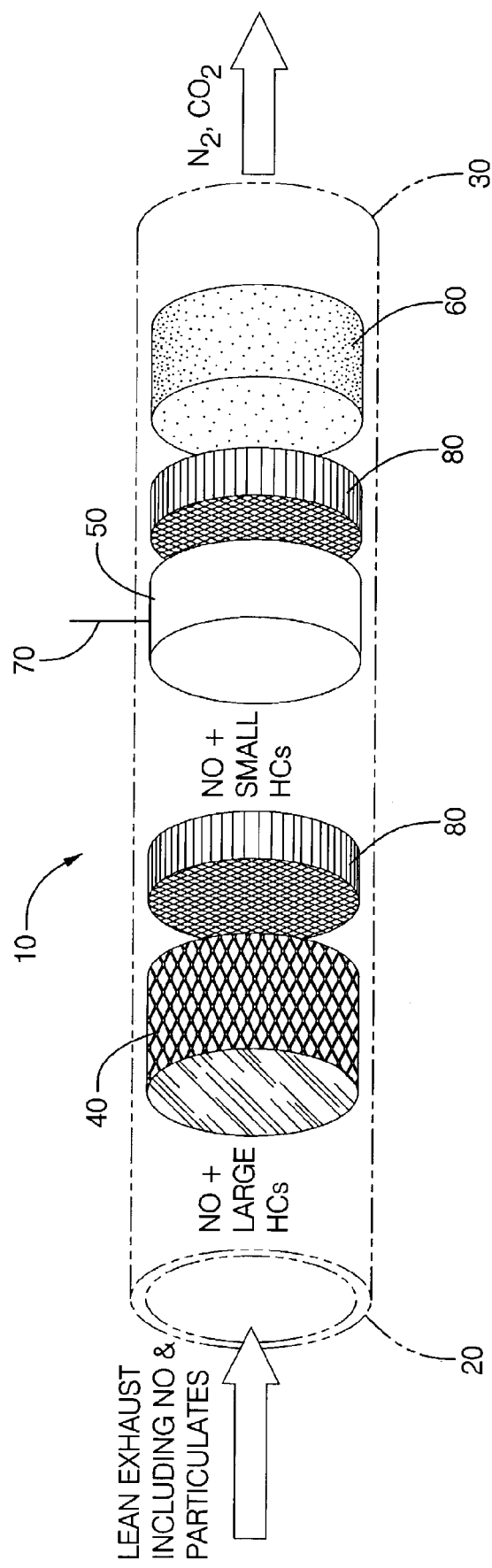
FIG. 1 is an exemplary gas treatment system.

A gas treatment system can comprise various combinations of components. The system for treating diesel and/or lean burn engine exhausts preferably comprise a cracking catalyst, optionally in combination with particulate filter(s), catalytic converter(s), plasma reactor(s) (e.g., non-thermal plasma reactors), and/or oxidation catalysts, and the like. For example, a cracking catalyst can be disposed up stream or mixed with an oxidation catalyst, with a diesel particulate filter(s) disposed upstream or downstream from the cracking catalyst. Downstream from the cracking catalyst, and preferably downstream from the particulate filter(s) can be a nitrogen oxide (NOx) adsorber, and optionally a catalytic converter can be employed downstream from the NOx adsorber. It is understood that these components can be disposed in a single unit. For example, the unit can comprise an opening such that a gas stream (e.g., an exhaust stream) would pass, in order, through the cracking catalyst, the diesel particulate filter, and the NOx adsorber. Alternatively, the gas stream can pass, in order, through the cracking catalyst, optionally a particulate filter, a non-thermal plasma reactor, optionally a second particulate filter, optionally a second non-thermal plasma reactor, and optionally a catalytic converter.

FIG. 1 illustrates one embodiment of the exhaust emission system. The system includes a housing 10 having an inlet 20 at one end and an outlet 30 at the other end. The housing 10 has preferably a shape of a cylinder, but can be made of any shape defining a gas flow path. The inlet 20 of the housing 10 is connected to a line (not shown) extended to an engine exhaust portion (not shown), and receives exhaust gas from the engine exhaust portion. The outlet 30 of the housing 10 expels a treated exhaust gas.

Adjacent to the inlet 20 and disposed in the housing 10, is a cracking unit 40 which serves to optimize the type of hydrocarbon arriving at the catalytic unit 60 because smaller HC molecules are more effective in reacting with $NO_x$ to form ammonia. The cracking unit 40 includes at least one cracking catalyst that is active under the particular operating conditions, e.g., the cracking unit operating temperature, preferably without consuming excess hydrocarbon which is released as thermal energy. For example, if the system is a stoichiometric gasoline system (e.g., a vehicle with average manifold temperatures of about 700° C. to about 950° C.; typically around 800° C.), then precious metals are preferably not employed because they are too active, i.e., they consume too much of the hydrocarbons merely in the production of thermal energy. Consequently, a catalytic catalyst for stoichiometric gasoline system preferably comprises base metal(s) (e.g., chromium, vanadium, iron, cobalt, nickel, copper, niobium, molybdenum, tungsten, manganese, and the like, as well as combinations comprising at least one of these metals) disposed on a high surface area (e.g., greater than or equal to about 70 m²/g after calcining) support (e.g., aluminum oxides, hexaaluminate, and the like), with essentially no precious metals (i.e., less than or equal to about 0.5 wt % total of ruthenium, iridium, gold, and silver (moderately active precious metals), and/or less than 0.05 wt % total of platinum, palladium and rhodium (highly active precious metals), based upon the total weight of the cracking catalyst). Less than or equal to about 0.2 wt % precious metals, based upon the total weight of the cracking catalyst is preferred. In contrast, if the system is a gasoline fueled lean burn vehicle (e.g., a vehicle with average manifold temperatures of about 400 to about 650° C.), then moderately active precious metals (e.g., silver, gold, ruthenium, osmium, iridium, and the like, as well as combinations comprising at least one of the foregoing metals), also disposed on high surface area support(s), are preferably used. These cracking catalysts also preferably comprise no highly active precious metals (e.g., platinum, palladium, rhodium, and the like, as well as combinations comprising at least one of these metals), with less than or equal to about 0.2 wt % highly active precious metals preferred, based upon the total weight of the cracking catalyst. Finally, if the system is a diesel fueled passenger car (e.g. a vehicle with an average manifold temperature of less than 400° C.), then the highly active precious metals are preferably employed, optionally on basic supports (e.g., zirconium oxides, titanium oxides, and the like, as well as combinations comprising at least one of the foregoing supports) are used.

Since an exhaust temperature of less than or equal to about 300° C. is insufficient to combust the soot, even in the presence of excess oxygen, materials that will form strongly oxidizing nitrates, such as alkaline metal oxides (i.e., oxides of Group 1 metals; e.g., lithium oxide, sodium oxide, potassium oxide, rubidium oxide, cesium oxide, and the like, as well as combinations comprising at least one of the foregoing oxides) are included in the cracking unit 40 catalyst formulation. Additionally, since the alkaline metal nitrates have high activity at about 500° C., but relatively low activity at about 300° C., materials can be added to lower the melting point of the alkaline metal oxides. Some materials employed for lowering the melting point of the alkaline metal oxides include base metals, alkaline earth metals (i.e., Group 2 metals; e.g., magnesium, calcium, strontium, barium, and the like) as well as oxides and combinations comprising at least one of the foregoing materials.

For use in a diesel environment, e.g., average manifold temperatures below about 400° C., preferably the cracking catalyst disposed in cracking unit 40 comprises a base metal (with vanadium, molybdenum, and combinations comprising at least one of these more preferred), a precious metal (with ruthenium stabilized with about 0.1 wt % to about 0.25 wt % platinum (based upon the total weight of the cracking catalyst), and combinations comprising ruthenium more preferred), an alkaline metal (with lithium, potassium, cesium and combinations comprising at least one of these more preferred), and an alkaline earth metal (with barium and strontium and combinations comprising at least one of these more preferred). As an example, a cracking catalyst may comprise ruthenium and 0.2 wt % platinum deposited on vanadium-cesium oxide coated aluminum oxide optionally doped with lithium oxide.

The low temperature cracking catalyst can comprise about 25 wt % to about 50 wt % support. Within this range, greater than or equal to about 30 wt % support is preferred, with greater than or equal to about 35 wt % support more preferred. Also within this range, less than or equal to about 45 wt % support is preferred. The low temperature cracking catalyst can further comprise less than or equal to about 10 wt % base metal, with about 2 wt % to about 10 wt % base metal preferred. Within this range, greater than or equal to about 4 wt % base metal is preferred. Also preferred within this range, is less than or equal to 9 wt % base metal. In addition to the base metal and support, the catalyst can comprise less than or equal to about 35 wt % alkaline metal oxide and/or up to about 10 wt % alkaline earth metal oxide, with about 15 wt % to about 25 wt % alkaline metal oxide preferred. Also preferred is up to about 3 wt % alkaline earth oxide. Finally, precious metals can be employed in an amount of up to about 0.5 wt %, with about 0.05 to about 0.5 wt % preferred. Within this range, greater than or equal to about 0.1 wt % precious metal is preferred. Also preferred within this range is an amount of precious metal of less than or equal to about 0.2 wt %. All of the above weight percentages are based upon the total weight of the cracking catalyst.

A medium temperature cracking system can comprise about 50 wt % to about 75 wt % support. Within this range, greater than or equal to about 55 wt % support is preferred, with greater than or equal to about 60 wt % support more preferred. Also within this range, less than or equal to about 70 wt % support is preferred. The medium temperature cracking catalyst can further comprise less than or equal to about 15 wt % base metal, with about 2 wt % to about 15 wt % preferred. Within this range, greater than or equal to about 5 wt % is preferred, with greater than or equal to about 7 wt % more preferred. Also preferred in this range is less than or equal to about 12 wt % base metal. The medium temperature cracking catalyst can further comprise less than or equal to about 10 wt % alkaline metal oxide and/or less than or equal to about 25 wt % alkaline earth metal oxide. Preferably, about 2 wt % to about 10 wt % alkaline metal oxide is employed. Within this range, greater than or equal to about 5 wt % alkaline metal oxide is preferred. Also preferred within this range, is less than or equal to 9 wt % alkaline metal oxide. Also preferred in about 1 wt % to about 25 wt % alkaline earth metal oxide. Within this range, greater than or equal to about 4 wt % alkaline earth metal oxide is preferred. Also preferred within this range, is less than or equal to 7 wt % alkaline earth metal oxide. Finally, although essentially no precious metals are employed, amounts of precious metals can be about 0.01 to about 0.05 wt %. All of the above weight percentages are based upon the total weight of the cracking catalyst.

The high temperature cracking catalyst can comprise about 75 wt % to about 100 wt % support. Within this range, greater than or equal to about 80 wt % is preferred, with greater than or equal to about 85 wt % more preferred. Also within this range, less than or equal to about 95 wt % is preferred. The high temperature cracking catalyst can further comprise less than or equal to about 25 wt % base metal, with about 5 wt % to about 25 wt % preferred. Within this range, greater than or equal to about 10 wt % is preferred. Also within this range, less than or equal to about 20 wt % is preferred. The high temperature cracking catalyst may also comprise less than or equal to about 10 wt % alkaline metal oxide and less than or equal to about 25 wt % alkaline earth metal oxide. Preferably, about 0.5 wt % to about 10 wt % alkaline metal oxide is employed. Within this range, greater than or equal to about 2 wt % alkaline metal oxide is preferred. Also preferred within this range, is less than or equal to 4 wt % alkaline metal oxide. Also preferred in about 1 wt % to about 25 wt % alkaline earth metal oxide. Within this range, greater than or equal to about 7 wt % alkaline earth metal oxide is preferred. Also preferred within this range, is less than or equal to 20 wt % alkaline earth metal oxide, with less than or equal to 12 wt % alkaline earth metal oxide more preferred. Finally, essentially no precious metals are employed. The amount of precious metals can be about 0.001 to about 0.02 wt %. All of the above weight percentages are based upon the total weight of the cracking catalyst.

In the cracking unit 40, particulates, particularly large HC molecules (e.g., HC molecules having up to about 20 or more carbon atoms per molecule) are decomposed to small HC molecules by the cracking catalyst, e.g., to molecules comprising less than or equal to about 8 carbon atoms per molecule (C/mcl), with less than or equal to about 6 C/mcl preferred, and less than or equal to about 4 C/mcl especially preferred, with greater than 1 C/mcl also typically preferred due to efficiency considerations. For example, the exhaust of a lean burn engine 8 fueled by diesel fuel and having a manifold temperature at inlet 20 of about 300° C., can be introduced to a cracking unit 40 having a cracking catalyst comprising highly active precious metals base metal(s), alkaline metal(s), and/or alkali earth metal(s). When the exhaust comprising oxygen and unburned diesel fuel enter the cracking unit 40, the fuel is partially oxidized in an exothermic reaction with the cracking catalyst that provides atomic oxygen and surface sites for the hydrocarbon to be adsorbed and "cracked". During the reaction, thermal energy and light hydrocarbon products are released to the gas phase, leaving excess carbon on the cracking catalyst as "soot" that is oxidized by the other catalytic materials (e.g., the oxides). Consequently, the stream exiting the cracking unit 40 typically comprises light HCs, NOx, CO, and C.

Downstream from the cracking unit 40, an optional plasma reactor 50 is disposed in the housing 10, with a non-thermal plasma reactor preferred. A plasma power controller 70 connected to the plasma reactor 50 controls the power applied to the plasma reactor 50. For example, a non-thermal plasma can be generated by several methods, such as electrical fields, electron beams, and irradiation with electromagnetic energy of appropriate intensity and wavelength. Preferably, non-thermal plasmas for treating exhaust gases are generated by electrical fields. Several kinds of configurations of plasma reactors can be employed, including an electrified packed bed reactor, a glow-discharge plasma reactor, a corona discharge reactor, a RF discharge reactor, a pulsed corona reactor, a dielectric-barrier discharge reactor, surface discharge reactor, or the like. In the plasma reactor 50, the NOx is converted to NO.

Downstream from the plasma reactor 50, a catalytic unit 60 is disposed adjacent to the outlet 30. In the catalytic unit 60, NO and the light hydrocarbons react on an acid adsorbing portion (e.g., alumina) of the catalyst to form ammonia ($NH_3$) and $CO_2$. The $NH_3$ then reacts with $NO_2$ on a base adsorbing portion (e.g., titanium-zirconium solid solution) of the catalyst to form nitrogen ($N_2$) and water ($H_2O$) prior to exiting outlet 30. The catalytic unit 60 includes a catalyst preferably disposed on and/or throughout a substrate, wherein the catalyst is capable of reducing the concentration of at least one component in the gas. The catalyst may comprise one or more catalyst materials that are washcoated, imbibed, impregnated, physisorbed, chemisorbed, precipitated, or otherwise applied to the substrate. Possible catalyst materials include metals, such as platinum, palladium, rhodium, iridium, ruthenium, zirconium, titanium, yttrium, cerium, and the like, as well as oxides, alloys, and combinations comprising at least one of the foregoing catalyst materials, and other catalysts.

The catalyst material may be combined with additional materials or sequentially disposed on the substrate with these additional materials. The additional materials may comprise oxides (e.g., aluminum oxide, zirconium oxide, titanium oxide, and the like, as well as mixtures and solid solutions comprising at least one of these oxides, with titanium-zirconium solid solutions preferred), aluminides, hexaaluminates, and the like, and combinations comprising at least one of the foregoing additional materials. Where an aluminide is used, preferably the aluminide comprises an aluminum in combination with at least one additional metal, such as, nickel, iron, titanium, copper, barium, strontium, calcium, silver, gold, platinum, and oxides and combinations comprising at least one of the foregoing, with nickel, iron, titanium, and oxides and combinations comprising at least one of the foregoing particularly preferred. Where a hexaaluminate is employed, the hexaaluminate preferably comprises a crystalline structure incorporating barium or lanthanum therein, into an aluminum and oxygen crystalline structure.

The additional materials may further comprise stabilizing agents, such as, Group IIa metals, rare earth metals, Group VIII metals, and the like, as well as, oxides, alloys, and combinations comprising at least one of the foregoing (wherein "Groups" refers to the "Periodic Table of the Elements"). Preferred stabilizing agents include barium, platinum, palladium, strontium, lanthanum, ruthenium, iridium, praseodymium, rhodium, gold, manganese, cobalt, and the like, as well as, oxides, alloys, and combinations comprising at least one of the foregoing, with barium, lanthanum, and combinations comprising at least one of the foregoing particularly preferred.

The substrate can comprise any material designed for use in the environment (e.g., a spark ignition or diesel engine) and having the following characteristics: (1) capable of operating at temperatures up to about 600° C., and up to about 1,000° C. for some applications, depending upon the device's location within the exhaust system (manifold mounted, close coupled, or underfloor) and the type of system (e.g., gasoline or diesel); (2) capable of withstanding exposure to hydrocarbons, nitrogen oxides, carbon monoxide, particulate matter (e.g., soot and the like), carbon dioxide, and/or sulfur; and (3) having sufficient surface area and structural integrity to support a catalyst, if desired. Some possible materials include cordierite, silicon carbide, metal, metal oxides (e.g., aluminum oxide, and the like), glasses, and the like, and mixtures comprising at least one of the foregoing materials. Some ceramic materials include "Honey Ceram", commercially available from NGK-Locke, Inc, Southfield, Mich., and "Celcor", commercially available from Corning, Inc., Corning, N.Y. These materials can be in the form of foils, perform, mat, fibrous material, monoliths (e.g., a honeycomb structure, and the like), other porous structures (e.g., porous glasses, sponges), foams, pellets, particles, molecular sieves, and the like (depending upon the particular device), and combinations comprising at least one of the foregoing materials and forms, e.g., metallic foils, open pore aluminum oxide sponges, and porous ultra-low expansion glasses. Furthermore, these substrates can be coated with oxides and/or aluminides, such as stainless steel foil coated with a platinum aluminide scale.

Although the substrate can have any size or geometry, the size and geometry are preferably chosen to optimize surface area in the given exhaust emission control device design parameters. Typically, the substrate has a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area.

Disposed between the plasma reactor 50 and the catalytic unit 60 and/or upstream of the plasma reactor 50 is an optional particulate trap 80 comprising a filter. As with the catalytic unit substrate, the filter can comprise any material designed for use in the environment and which can remove particulate matter from a gaseous stream. Some possible materials include ceramics (e.g., extruded ceramics), metals (e.g., extruded, sintered metals), and silicon carbide; e.g., cordierite, aluminum oxide, aluminum phosphate and the like), sintered steel (preferably sintered stainless steel), and the like, and mixtures comprising at least one of the foregoing materials.

The filter can comprise a gas permeable ceramic material having a honeycomb structure consisting of a plurality of channels, preferably parallel channels. The channels can be divided into alternating inlet channels and exit channels. The inlet channels are open at an inlet end of the filter element and preferably plugged at the exit end. Conversely, exit channels are preferably plugged at the inlet end and open at the exit end. The inlet and exit channels are separated by thin porous longitudinal sidewalls, which permit the exhaust gases to pass from the inlet channels to the exit channels along their length.

The filter may also comprise a catalytic material, preferably a thin layer disposed on and/or in the filter element. The catalytic material can be any catalyst capable of reducing the concentration of at least one component in the exhaust gas. Thus, the catalyst may comprise one or more catalytic materials. The catalytic materials may be wash coated, imbibed, impregnated, physisorbed, chemisorbed, precipitated, or otherwise applied to the filter. Possible catalyst materials include metals, such as barium, cesium, vanadium, molybdenum, niobium, tungsten, platinum, palladium, rhodium, iridium, ruthenium, zirconium, yttrium, cerium, lanthanum, and the like, as well as oxides, alloys, and combinations comprising at least one of the foregoing catalyst materials, and other catalysts.

For example, for passenger vehicles where exhaust temperatures are low (i.e., less than about 600° C.), a particulate trap comprising sintered metal is preferred, e.g., a sintered metal trap brazed into a "thermos bottle" type shell. The shell may be filled with a salt. Possible compounds include cesium-vanadium and cesium-molybdenum. For particularly cold applications, e.g., small cars, lithium oxide, potassium oxide and/or cesium-vanadium oxide may be added to the trap.

During operation of the system, fuel is optionally post injected (e.g., injecting fuel-late ATDC (after top dead center) into the hot engine, allowing the fuel to heat without combusting and then flow into the exhaust manifold once the exhaust valve opens, into the exhaust stream; and/or injecting directly into the exhaust stream upstream of the cracking catalyst). The exhaust gases, typically comprising HCs, oxygen, and $NO_x$, and a significant amount of particulate matter (e.g., soot and the like), are introduced into the cracking unit 40 through the inlet 20. In the cracking unit 40, post injected HC molecules are cracked into smaller HC molecules by a catalytic reaction. Greater than or equal to about 50 wt % of the hydrocarbons in the exhaust gas have less than 6 C/mcl when exiting the cracking unit 40, with greater than or equal to about 70 wt % preferred, based upon the total weight of HC in the exhaust gases entering the cracking unit 40. On a gasoline system, greater than or equal to about 90 wt % of the hydrocarbons in the exhaust gas have less than 6 C/mcl when exiting the cracking unit, while typically greater than or equal to about 60 wt % of the hydrocarbons in the exhaust gas have less than 6 C/mcl when exiting the cracking unit 40 on a diesel system.

The exhaust gases are then optionally introduced into the plasma reactor 50 before or after optionally passing the gases through a particulate filter 80. In the plasma reactor 50, a plasma is generated by, for example, a high voltage (e.g., a voltage of about 5 kilovolts per centimeter (KV/cm) or more, with a voltage of about 5 KV/cm to about 30 KV/cm preferred), applied to the plasma reactor 50 by the power controller 70. The plasma in the plasma reactor 50 is believed to promote the conversion of the NO to $NO_2$.

Accordingly, gases containing $NO_2$, oxidized HCs, cracked HCs, oxygen, ammonia ($NH_3$), and any remaining NO, are introduced to the catalytic unit 60. In the catalytic unit 60, the concentration of at least some of the constituents in the exhaust gases are reduced, e.g., converted into $N_2$, $CO_2$, and/or water that are expelled through the outlet 30 of the housing 10.

Optionally, prior to entering the cracking unit 40, plasma reactor 50, and/or catalytic unit 60, the exhaust gases may be passed through a particulate filter 80 to remove particles such as soot and the like therefrom. Disposal of the particulate filter downstream of the plasma reactor 50, with an optional subsequent plasma reactor downstream of the particulate filter is particularly preferred such that $NO_2$ in the exhaust gases can regenerate the particulate filter (e.g., remove carbon therefrom due to reaction between the carbon and the $NO_2$ forming carbon monoxide and NO), and the formed NO can be converted to $NH_3$ in the catalytic unit 60.

In order to minimize exhaust emissions, it is preferred to control the system so as to introduce equal amounts of NO and $NO_2$ to the catalytic unit 60. With equal amounts of the NO and the $NO_2$ in the exhaust stream entering the catalytic unit, complete NOx conversion can be attained. Controlling the system can be attained in various fashions, including: controlling additional HC injection (e.g., post injection into the engine cylinder and/or injection directly into the exhaust stream), controlling the plasma reactor 50. Controlling the plasma reactor 50 can be accomplished by cycling (operating or not operating) the reactor and/or diverting all or a portion of the exhaust stream around the reactor based upon the engine operation (acceleration/deceleration/idle . . . ) and/or upon the amount of $NO_2$ in the exhaust stream (versus the amount of NO). In such a system, appropriate components (e.g., sensors, valves, controllers (e.g., computers . . . ) can be employed. Preferably, the concentration of NO and $NO_2$ in the exhaust gas stream is maintained at about 40 mole percent (mol %) to about 60 mol % of $NO_2$ and about 40 mol % to about 60 mol % of NO, based upon the total moles of NO and $NO_2$ in the exhaust stream entering the catalyst unit 60. Alternatively, the concentration of $NH_3$ and $NO_2$ in the exhaust gas stream entering the catalytic unit can be controlled to be about 40 mol % to about 60 mol % of $NO_2$ and about 40 mol % to about 60 mol % of $NH_3$, based upon the total moles of $NH_3$ and $NO_2$ in the stream entering the catalyst unit 60.

Due to inherent inefficiencies in a typical system, optionally, the system can further be controlled to ensure complete conversion of $NO_2$ to $N_2$. Controlling the system to ensure complete conversion of $NO_2$ to $N_2$ can comprise determining what percentage of NO in the exhaust stream is converted to $NH_3$ in the catalyst unit, and what percentage of the $NH_3$ reacts with the $NO_2$. With this information, the amount of $NO_2$ in the exhaust stream entering the catalyst can be monitored and the amount of NO adjusted to ensure complete conversion of $NO_2$, the amount of $NO_2$ entering the catalyst unit can be adjusted (e.g., by directing the exhaust stream, or a portion thereof, around or through a particulate trap, and/or, if a plasma reactor is employed in the system, by controlling the plasma reactor, and/or the temperature of the stream can be controlled to cause the $NO_2$ to decompose to NO (e.g., raising the stream temperature to greater than or equal to about 800° C.).

When a plasma reactor is run continuously, 100% of the NO is converted to $NO_2$. Since $NO_2$ does not react with HC, poor $NO_x$ reduction is the result. Any hydrocarbon added while the plasma reactor is operating is wasted. If hydrocarbon is added while the plasma reactor is turned off, NO reacts with HC forming $NH_3$. A catalyst bed than can adsorb base is preferably available downstream of the reactor, otherwise the $NH_3$ is lost to the exhaust stream and converted back to NO by the cleanup oxidation catalyst. After some quantity of $NH_3$ has been stored, the plasma reactor can be turned on for a short period. The NO is converted to $NO_2$ in the plasma, and the $NO_2$ reacts with the stored $NH_3$, forming $N_2$ and water. When the stored $NH_3$ is exhausted, the plasma reactor preferably ceases operation and the hydrocarbon injection begins again. Consequently, the plasma reactor is preferably included in the system because when $NO_2$ is needed, the plasma reactor can be turned on, when NO is needed the plasma reactor can be turned off. Net conversion of NOx to $N_2$ can be greater than or equal to about 80% of the total amount of NOx in the exhaust gas exiting the engine since the plasma reactor can optimize the ratio of NO to $NO_2$ as needed. No other system offers that advantage.

EXAMPLE: A deposition of platinum ammine and rhodium ammine at a 14:1 ratio can be loaded on a catalytic cracking unit comprising aluminum oxide material at 40 grams per cubic feet of substrate volume. A mixture of 102 grams platinum-rhodium-aluminum oxide, 70 grams cesium oxide and 46 grams vanadium oxide and 17 grams potassium hydroxide can be deposited on that catalytic cracking unit at a loading of 0.75 grams per cubic inch of substrate volume. These molten salt compounds increase the oxidation activity, oxidizing the carbon, and increase the reforming activity of the platinum-rhodium-aluminum oxide.

A non-thermal plasma reactor can be located after (preferably immediately downstream) of the exhaust port of a diesel or lean burn engine, with a catalytic cracking unit and a particulate trap preferably located downstream of the non-thermal plasma reactor (with immediately downstream preferred; i.e., as the stream exits the reactor it enters the cracking unit).

A $NO_x$ and $NH_3$ adsorbing bed can be located downstream of the particulate trap (i.e., a catalytic unit). The adsorbing bed can contain about 20 wt % to about 50 wt % titanium-zirconium solid solution and up to about 25 wt % (preferably about 10 wt % to about 20 wt %) zeolite, balance aluminum oxide, based upon the total weight of the zeolite, solid solution, and aluminum oxide. Preferably, a combined loading of about 1.5 grams solids per cubic inch ($g/in^3$) to about 4 $g/in^3$ is attained, with a loading of about 2.5 $g/in^3$ to about 3.5 $g/in^3$ more preferred. For example, the adsorbing bed can comprise about 35 wt % gamma-aluminum oxide, 40 wt % titanium-zirconium solid solution, and 25 wt % Y-zeolite, based upon the total weight of the zeolite, titanium-zirconium solid solution, and aluminum oxide.

Additional stabilizing additives such as calcium-zirconium oxide, barium-zirconium oxide, and/or lithium-zirconium oxide, are preferentially included in the adsorbing bed in an amount of about 0.1 wt % to about 47.0 wt %, based upon the total weight of stabilizing additives, aluminum oxide, titanium-zirconium solid solution, and zeolite. A preferred stabilizing additive loading is about 4 wt % to about 20 wt %.

Precious metals can also be included in the adsorbing bed, with platinum (Pt) and/or rhodium (Rh) generally preferred. The precious metals can be employed in an amount of less than or equal to about 300 grams per cubic foot (g/ft$^3$), with a loading of a sufficient amount of precious metal to store all exhaust NO during short lean periods preferred. Preferably the total loading of all precious metals in the adsorber is about 50 g/ft$^3$ to about 275 g/ft$^3$, with about 100 g/ft$^3$ to about 200 g/ft$^3$ more preferred.

During operation, the NO adsorbs strongly to the precious metal. The products of cracking, especially hydrogen (H$_2$) and carbon monoxide (CO), also adsorb strongly to the precious metals. At exhaust temperatures of less than or equal to about 300° C. the Pt—Rh—NO react quickly with the H$_2$ and CO on the precious metal surface forming ammonia (NH$_3$), water (H$_2$O), and carbon dioxide (CO$_2$). The ammonia (NH$_3$) is trapped on an adsorber, and reacts with exhaust nitrogen dioxide (NO$_2$) forming diatomic nitrogen (N$_2$) and water (H$_2$O).

The disclosed method can be embodied in the form of computer or controller implemented processes and apparatuses for practicing those processes. It can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the method. The method may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the method. When implemented on a general-purpose microprocessor, the computer program code segments configure the microprocessor to create specific logic circuits.

The method disclosed herein can comprise controlling post injection of HC into the engine (i.e., injecting late; e.g., ATDC) in order to attain a desired NO/NO$_2$ ratio in the exhaust stream entering a catalyst unit. Preferably, however, the system employs a cracking unit, in combination with various other components such as the particulate trap(s), NOx adsorber(s) and a catalytic converter(s), such that efficient and effective treatment of the exhaust gas can be achieved. For example, by combining the plasma reactor, particularly a non-thermal plasma reactor, with a cracking unit, NOx contained in exhaust gases can be effectively and efficiently reduced. With the system disclosed herein, essentially, greater than or equal to about 60 wt % of the NOx (based upon the total weight of NOx in the exhaust stream exiting the engine), with greater than or equal to 80 wt % removed from the stream preferred. In contrast, systems that do not employ this combination of cracking unit and plasma reactor or do not employ the method disclosed herein only attain up to 30 wt % NOx removal.

While preferred embodiments have been shown and described, various modifications and substitutions may be made thereto without departing from the spirit and scope of the invention. Accordingly, it is to be understood that the system and method have been described by way of illustration only, and such illustrations and embodiments as have been disclosed herein are not to be construed as limiting to the claims.

The invention claimed is:

1. A gas treatment system for treating an exhaust gas produced by an internal combustion engine and including hydrocarbon compounds and NO$_x$, said NO$_x$ includes NO and NO$_2$, said system comprising:

hydrocarbon cracking unit adapted to receive said exhaust gas and comprising a cracking catalyst effective to reform hydrocarbon compounds, said cracking catalyst comprising an alkali metal oxide and an amount of an alkali earth metal oxide effective to reduce the melting point of said alkali metal oxide;

a plasma reactor adapted to react a portion of the NO to form NO$_2$; and a catalytic unit disposed downstream of said hydrocarbon cracking unit and said plasma reactor, said catalytic unit being capable of converting NO and hydrocarbon compounds to form NH$_3$, and capable of converting NH$_3$ and NO$_2$ to form N$_2$.

2. The gas treatment system of claim 1, wherein the engine has an average manifold temperature of less than 400° C., and wherein the cracking catalyst comprises a precious metal selected from the group consisting of platinum, palladium, rhodium, and combinations comprising at least one of the foregoing precious metals, and a base metal oxide comprising a base metal selected from the group consisting of chromium, vanadium, iron, cobalt, nickel, copper, niobium, molybdenum, tungsten, manganese, and combinations comprising at least one of the foregoing base metals, and wherein the alkali earth metal oxide is selected from the group of barium oxide and strontium oxide;

wherein the alkali metal oxide is selected from lithium oxide, potassium oxide and cesium oxide; and wherein the precious metal, base metal oxide, alkali earth oxide and alkali oxide are disposed on a support.

3. The gas treatment system of claim 2, wherein the base metal is vanadium or molybdenum.

4. The gas treatment system of claim 2, wherein the support is an aluminum oxide support or a hexaaluminate support.

5. The gas treatment system of claim 2, wherein the cracking catalyst comprises vanadium-cesium oxide.

6. The gas treatment system of claim 1, wherein the engine has an average manifold temperature of 400° C. to about 650° C., and wherein the cracking catalyst comprises a precious metal selected from the group consisting of silver, gold, ruthenium, osmium, iridium and combinations comprising at least one of the foregoing, a base metal oxide comprising a base metal selected from the group consisting of chromium, vanadium, iron, cobalt, nickel, copper, niobium, molybdenum, tungsten, manganese, and combinations comprising at least one of the foregoing base metals, and wherein the alkali earth metal oxide is selected from the group of barium oxide and strontium oxide;

wherein the alkali metal oxide is selected from lithium oxide, potassium oxide and cesium oxide; and wherein the precious metal, base metal and alkali earth oxide are disposed on a support.

7. The gas treatment system of claim 6, wherein the base metal is vanadium or molybdenum.

8. The gas treatment system of claim 1, wherein the engine has an average manifold temperature of about 700°

C. to about 950° C., and wherein the cracking catalyst further comprises a base metal oxide comprising a metal selected from the group consisting of chromium, vanadium, iron, cobalt, nickel, copper, niobium, molybdenum, tungsten, manganese, and
and less than or equal to about 0.5 wt % precious metals, based upon the total weight of the cracking catalyst.

9. The gas treatment system of claim 8, wherein cracking catalyst comprises less than or equal to about 0.2 wt % precious metals.

10. The gas treatment system of claim 8, wherein the base metal is vanadium or molybdenum.

* * * * *